United States Patent
Loewe

(10) Patent No.: US 7,036,455 B2
(45) Date of Patent: May 2, 2006

(54) ANIMAL FEEDING DEVICE AND FACILITY FOR HOUSING THE SAME

(75) Inventor: John T. Loewe, Eldora, IA (US)

(73) Assignee: United Suppliers, Inc., Eldora, IA (US)

( * ) Notice: Subject to any disclaimer, the term of this patent is extended or adjusted under 35 U.S.C. 154(b) by 0 days.

(21) Appl. No.: 10/871,634

(22) Filed: Jun. 18, 2004

(65) Prior Publication Data

US 2006/0000417 A1    Jan. 5, 2006

(51) Int. Cl.
*A01K 5/00* (2006.01)

(52) U.S. Cl. .................................................. 119/53

(58) Field of Classification Search .............. 119/53, 119/53.5, 52.1, 54
See application file for complete search history.

(56) References Cited

U.S. PATENT DOCUMENTS

| | | | | |
|---|---|---|---|---|
| 1,444,428 | A | * | 2/1923 | Robbins ....................... 119/55 |
| 1,701,338 | A | * | 2/1929 | Rowles ......................... 119/54 |
| 1,719,245 | A | * | 7/1929 | Smidley ..................... 119/53.5 |
| 2,234,112 | A | * | 3/1941 | Emrick ....................... 119/53.5 |
| 2,522,635 | A | * | 9/1950 | Pittenger et al. ............... 119/54 |
| 4,364,333 | A | | 12/1982 | Touchette |
| 4,895,109 | A | | 1/1990 | De Groot et al. |
| 4,915,060 | A | | 4/1990 | Kling et al. |
| 5,003,926 | A | | 4/1991 | Bratrud |
| 5,069,164 | A | | 12/1991 | Wiwi |
| 5,275,130 | A | | 1/1994 | Muckler |
| 5,315,958 | A | | 5/1994 | Forster |
| 5,570,656 | A | | 11/1996 | Waldner et al. |
| 6,604,488 | B1 | * | 8/2003 | Heinzeroth et al. ...... 119/61.57 |
| 6,659,040 | B1 | | 12/2003 | Decker |

* cited by examiner

Primary Examiner—T. Nguyen

(57) ABSTRACT

An improved animal feeding device for storing and dispensing feed includes a trough and a hopper located above the trough and having opposite sides, opposite ends, an open bottom, and an open top. A downwardly sloping baffle is disposed within the hopper and having a base secured to the trough. A first slide is moveably connected to the hopper and positioned adjacent the base of the baffle, which prevents rain and other moisture from entering the hopper and saturating the feed. A second slide is moveably connected to the hopper and positioned in spaced alignment to the first slide to provide protection from the elements. An animal feeding facility also is provided for housing the animal feeding device.

4 Claims, 5 Drawing Sheets

US 7,036,455 B2

ANIMAL FEEDING DEVICE AND FACILITY FOR HOUSING THE SAME

BACKGROUND OF THE INVENTION

The present invention relates to animal feeders and, more specifically, to an improved animal feeding device and a facility for housing the same.

Animal feeders are well known in the art and numerous designs have been developed in an attempt to efficiently control the dispensing of feed. U.S. Pat. No. 5,570,656 to Waldner et al. discloses a typical animal feeder whereby feed stored in the hopper is directed through a discharge opening by a baffle and into a trough. The flow of the feed into the trough is controlled by a gate that is movable to vary the size of the discharge opening. The disadvantage of this conventional design is that rain and other moisture can easily slip past the gate and saturate the feed at the bottom of the hopper, causing the feed to congeal and prevent fresh feed from reaching the trough.

Some animal feeder designs have attempted to address this problem. For instance, U.S. Pat. No. 4,895,109 to De Groot et al. has improved upon the conventional animal feeder design by including multiple closing plates such that rain and other moisture are not likely to penetrate the hopper. Alternatively, U.S. Pat. No. 5,315,958 to Förster has provided a worm conveyor that drives the feed out of the hopper. Even if feed at the bottom of the hopper should become saturated and congeal, the worm conveyor forces the feed out of the hopper, allowing fresh feed to reach the trough. The disadvantage of these designs is that they are expensive to manufacture or require the use of many components.

Another disadvantage of conventional animal feeders is that it is difficult for a person to determine how much feed remains inside the hopper of the feeder. Conventional feeders have no means of indicating when feed inside the hopper is running low. Rather, to determine the fill level inside the hopper, a farmer has no option but to open the hopper lid and visually inspect the contents from above. This procedure is time consuming and labor intensive.

Still a further disadvantage of conventional animal feeders is that the hopper lids often are difficult to open and open in such a manner that encumbers replenishing the feed. Most conventional feeders have split top lids whereby each half is separately hinged and opens independent of the other half. A farmer must open both halves of the hopper lid to gain access to the hopper in order to replenish feed, which is time consuming and labor intensive.

Animal feeders typically are placed in animal feeding facilities. Conventional animal feeding facilities include a plurality of pens where the cattle and other livestock are exposed to sunlight, wind, and other elements. These feeding facilities are traditionally large and thus are not efficient for use by small producers. Livestock are healthiest and will eat regularly when they are kept in a calming environment. When conventional feeding facilities do not protect the livestock from the elements, the livestock are anxious and either stop eating or overeat when weather conditions return to normal. Additionally, cleaning individual pens is difficult in conventional feeding facilities because moving livestock from one pen to another can be difficult.

It is therefore a principal object of this invention to provide an inexpensive animal feeder that allows for the efficient and controlled dispensing of feed while preventing rain and other moisture from saturating the feed and blocking the animal feeder.

Another object of this invention is to provide an animal feeder with a first slide device that permits the efficient and controlled dispensing of feed and a second slide device that prevents rain and other moisture from saturating the feed.

A further object of this invention is to provide an animal feeding facility that protects the livestock from excessive sunlight, wind, rain, snow, and other elements.

Still a further object of this invention is to provide an animal feeding facility that allows livestock to be easily moved from pen to pen such that individual pens may be cleaned.

These and other objects will be apparent to those skilled in the art.

BRIEF SUMMARY OF THE INVENTION

The present invention is directed toward an improved animal feeding device for storing and dispensing feed that comprises a trough and a hopper located above the trough and having opposite sides, opposite ends, an open bottom, and an open top. A downwardly sloping baffle is disposed within the hopper and has a base secured to the trough. A first slide is moveably connected to the hopper and positioned adjacent the base of the baffle, which prevents rain and other moisture from entering the hopper and saturating the feed. A second slide is moveably connected to the hopper and positioned in spaced alignment to the first slide to provide additional protection from the elements.

The present invention also is directed towards an animal feeding facility for housing the animal feeding device. The feeding facility includes opposite side walls and a roof extending above and between the side walls. A plurality of animal pens are provided within the building. Additionally, a plurality of gates adjacent to the pens are provided that swing to form a first and second alleyway extending between the side walls, the first alleyway in front of the second. Further, a plurality of animal feeders are provided within the pens and located parallel to and adjacent with the second alleyway.

DESCRIPTION OF THE PREFERRED EMBODIMENTS OF THE INVENTION

Figure 1:
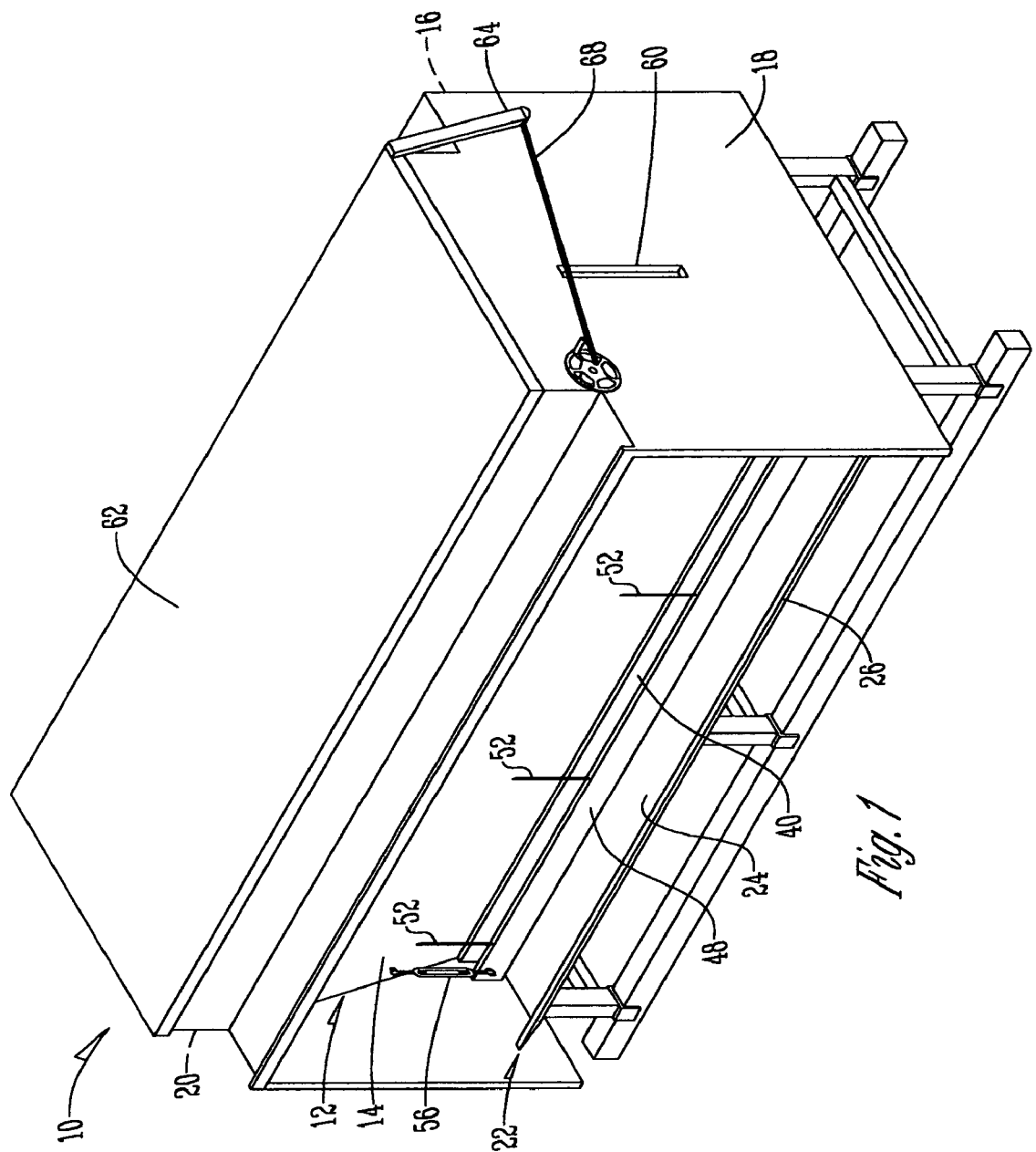
FIG. 1 is a perspective drawing of the animal feeding device of the present invention.
Figure 2:
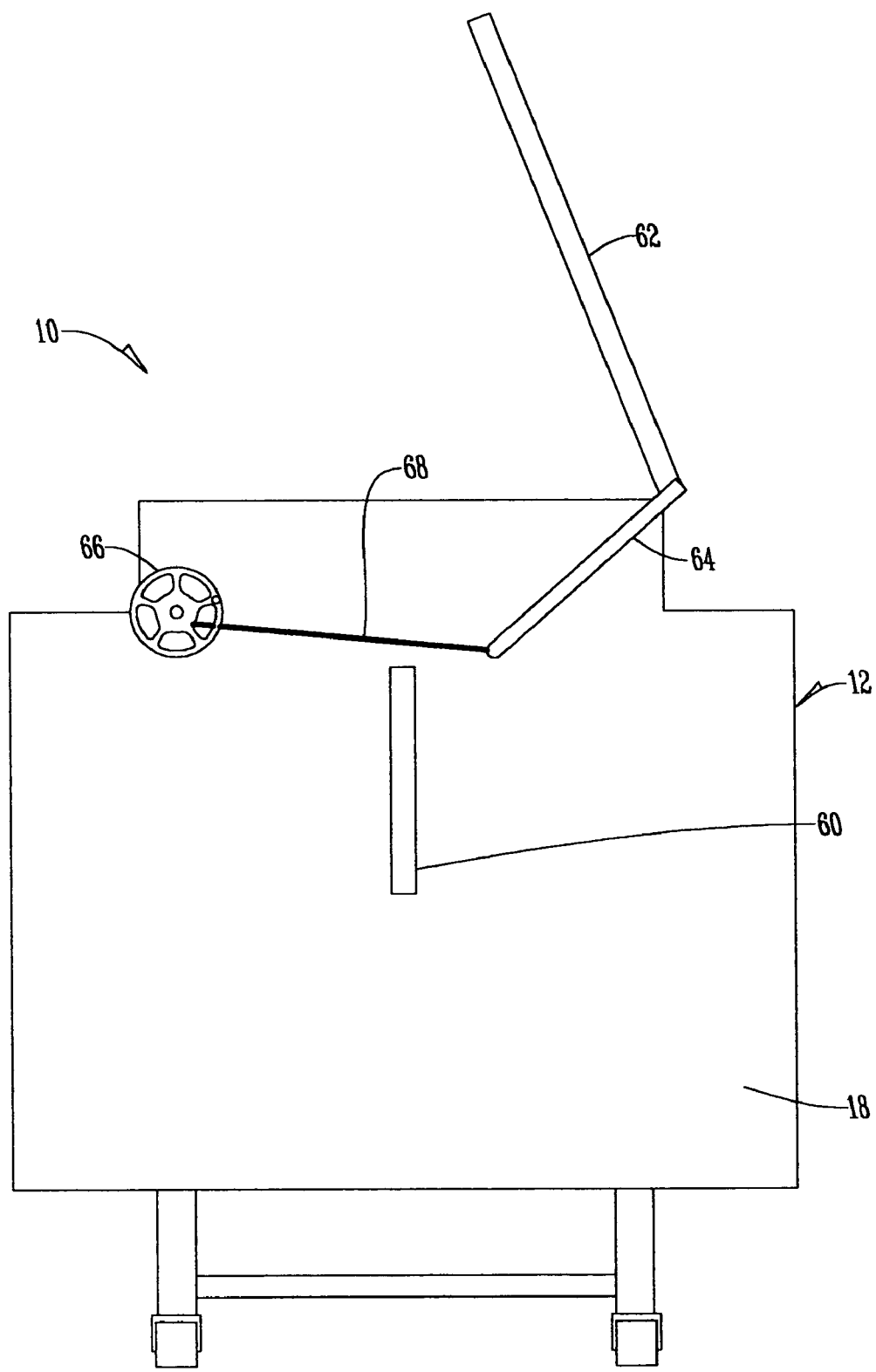
FIG. 2 is a side view of the animal feeding device of the present invention.
Figure 3:
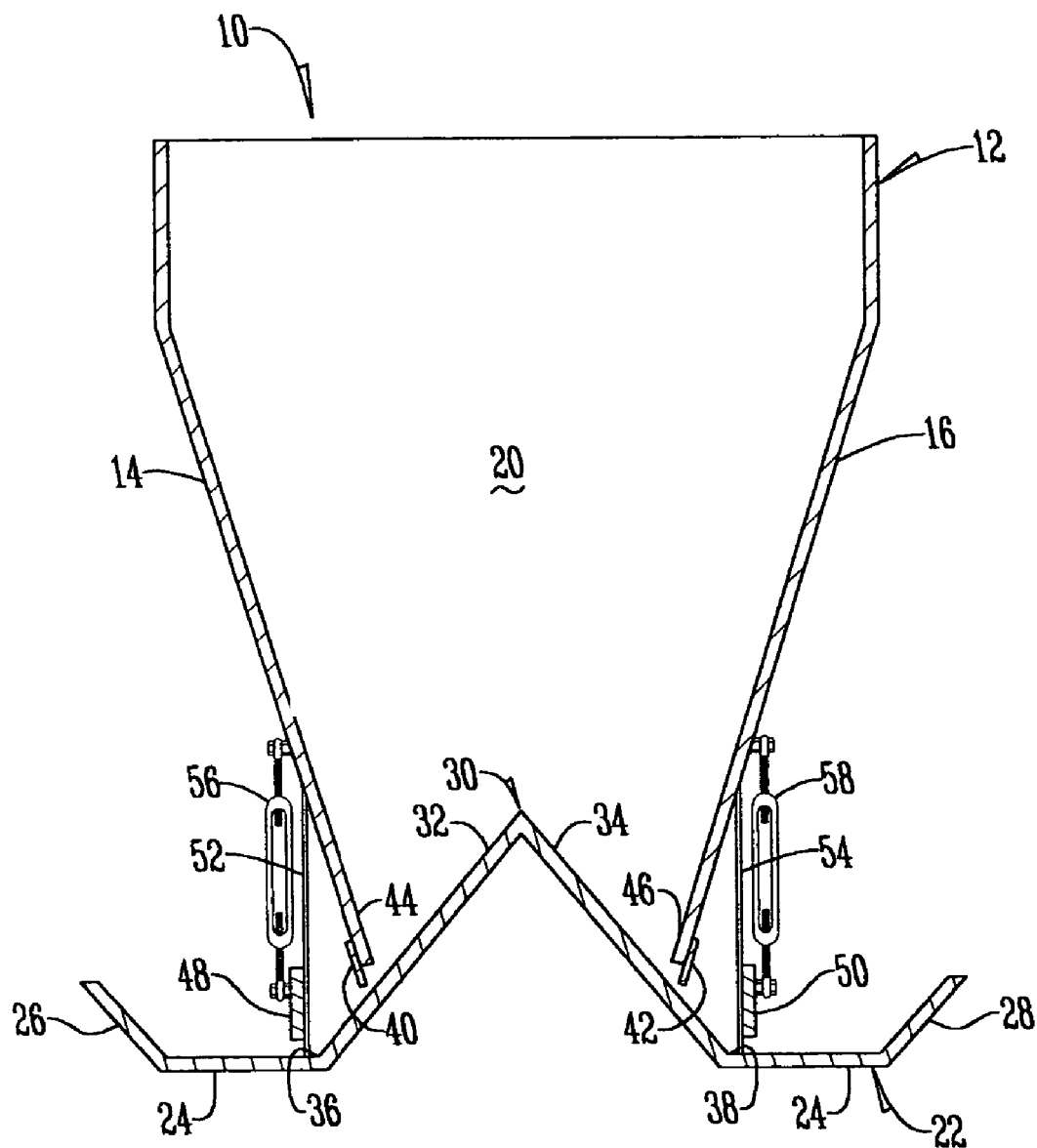
FIG. 3 is a side sectional view of the hopper and trough of the animal feeding device of the present invention.

With reference to FIGS. 1–3, an animal feeding device 10 is disclosed that comprises a hopper 12, which is used to store and dispense feed. Hopper 12 has sides 14 and 16 and ends 18 and 20, forming an open bottom and open top.

Hopper 12 is positioned above a trough 22, which receives feed from the hopper 12 for consumption by livestock and other animals. Trough 22 has a generally horizontal bottom section 24 and angular sides 26 and 28.

A baffle 30 is secured to and adjacent the bottom section 24 of trough 22 and resides within the hopper 12, as shown in FIG. 3. The baffle 30 is comprised of two downwardly sloping plates 32 and 34 that are connected at the top and extend outwardly across the feeding device 10 to form base portions 36 and 38 that engage trough 22.

First slides 40 and 42, which are also known as control slides, are moveably connected to the bottom portions 44 and 46 of sides 14 and 16 of hopper 12 and are adjacent the base portions 36 and 38 of the baffle 30, as best shown in FIG. 3. First slides 40 and 42 move about the bottom portions 44 and 46 such that the first slides 40 and 42 are moved to vary the size of the opening between the bottom portions 44 and 46 of the hopper 12 and the plates 32 and 34 of the baffle 30. Preferably, first slides 40 and 42 are set approximately 1" above the plates 32 and 34 of the baffle 30 such that corn cobs and other bulky objects in the hopper 12 are not lodged underneath the slides. Additionally, positioning the slides 40 and 42 in this manner prevents rain from penetrating the feed inside the hopper 12.

Second slides 48 and 50, which are also known as feed slides, are moveably connected to the hopper 12 and are in spaced alignment to the first slides 40 and 42, as best shown in FIG. 3. Specifically, second slides 48 and 50 are moveably connected to guides 52 and 54, which are attached to sides 14 and 16 of the hopper 12. Second slides 48 and 50 slide vertically about guides 52 and 54 and are locked in place by turnbuckles 56 and 58. Turnbuckles 56 and 58 are bolted to the sides 14 and 16 of the hopper 12 at one end and the second slides 48 and 50 at the opposite end, as best shown in FIG. 3. The turnbuckles 56 and 58 do not incur the force of the grain inside the hopper, thus allowing the turnbuckles 56 and 58 to rotate without having to use excessive force or yank on the second slides 48 and 50 which occurs with conventional feeder devices. By rotating the turnbuckles 56 and 58, second slides 48 and 50 will slide vertically about guides 52 and 54 in a smooth and continuous manner. The second slides 48 and 50 vary the size of the opening between the second slides 48 and 50 and the base portions 36 and 38 of the baffle 30. Preferably, the second slides 48 and 50 are spaced approximately four inches apart from the first slides 40 and 42. As such, a farmer is able to clean out wet or moldy feed trapped between the slides with a screwdriver or the like. Additionally, with the second slides 48 and 50 positioned in this manner, cattle and other livestock are unable to penetrate beyond the second slides 48 and 50 and tamper with the first slides 40 and 42.

Window 60 is positioned on the hopper 12 and is useful for determining the amount of feed stored inside the hopper 12. As shown in FIGS. 1 and 2, the window 60 is preferably positioned on the end 18 of the hopper 12. Alternatively, the window 60 may be placed in either end 18 or 20 or in either side 14 or 16 of the hopper 12.

A lid 62 is hingedly attached to the hopper 12 and closes, as shown in FIG. 1, to protect the feed inside hopper 12 from the outside environment. The lid 62 is of a single-piece construction. Lid 62 includes an arm 64 which is used to open or close the lid 62.

A winch assembly 66 is mounted on either of the ends 18 or 20 of the hopper 12, as shown in FIGS. 1 and 2. The winch assembly 66 includes a cable 68, which attaches to the arm 64 of the lid 62. By cranking the winch assembly 66, the cable 68 and arm 64 are drawn in towards the winch assembly 66, thereby raising the lid 62, as shown in FIG. 2. The winch assembly 66 raises the lid 62 to a fully open position (not shown) in which fresh feed may be added to the hopper 12. The winch is manually operated or alternatively supplied with a power source (not shown) for automated operation.

In operation, the animal feeding device 10 stores fresh feed and efficiently dispenses a controlled amount of feed while preventing rain and other moisture from entering into the hopper 12. Specifically, the baffle 30 directs feed inside the hopper 12 towards the opening formed between the first slides 40 and 42 and the plates 32 and 34 of the baffle 30. The flow rate can be adjusted by sliding the first slides 40 and 42 about the bottom portions 44 and 46 of the hopper 12. Because the first slides 40 and 42 are positioned above the plates 32 and 34 of the baffle 30, rain and other moisture are unable to penetrate inside the hopper 12 and saturate the feed. The flow rate of the feed is further controlled by the second slides 48 and 50, which can be adjusted by rotating the turnbuckles 56 and 58 to move the second slides 48 and 50 vertically within the guides 52 and 54. The amount of feed stored inside the hopper 12 can be determined by viewing the feed level through the window 60 in the hopper 12. When fresh feed must be added, the lid 62 can be opened via the winch assembly 66, allowing for full access to the inside of the hopper 12.

Figure 4:
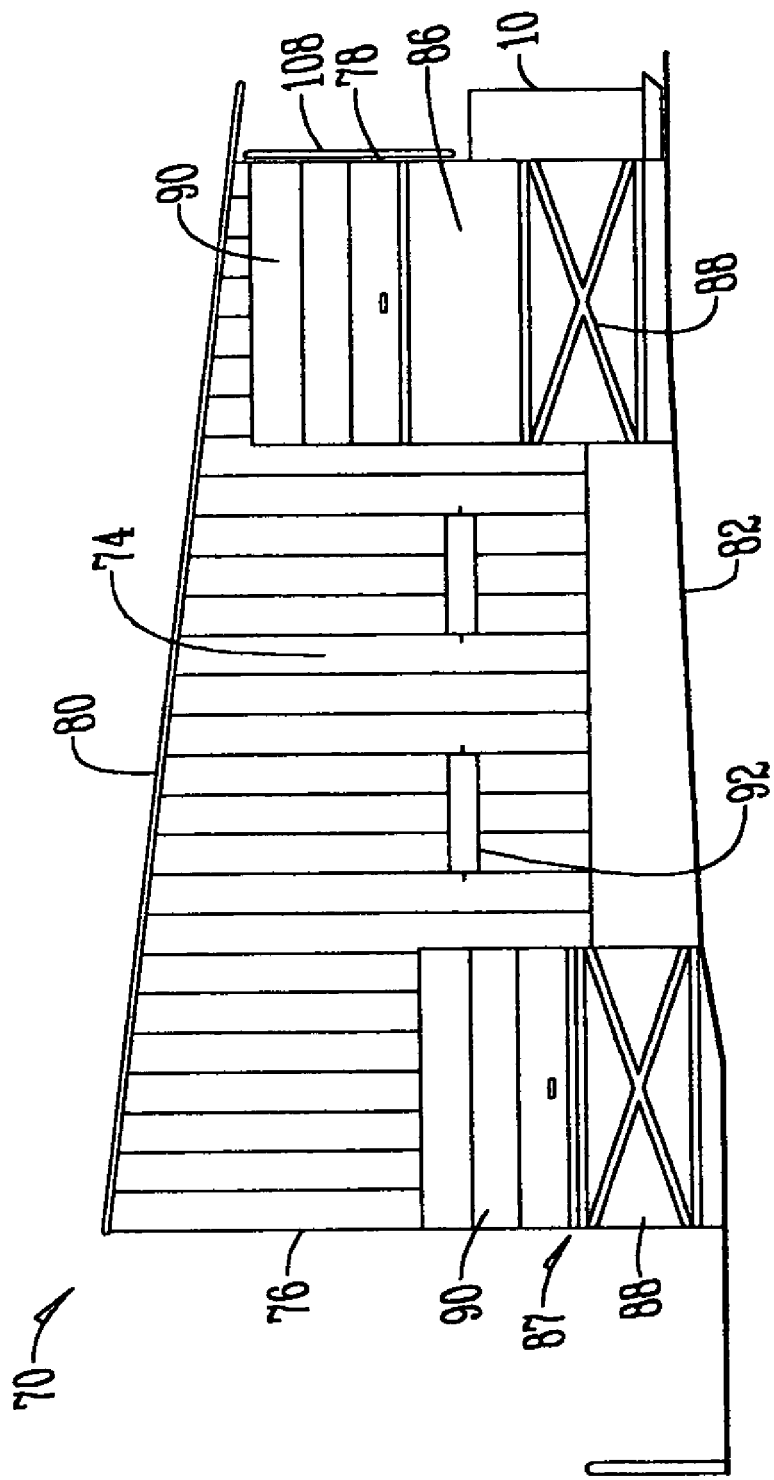
FIG. 4 is a side view of the animal feeding facility of the present invention.
Figure 5:
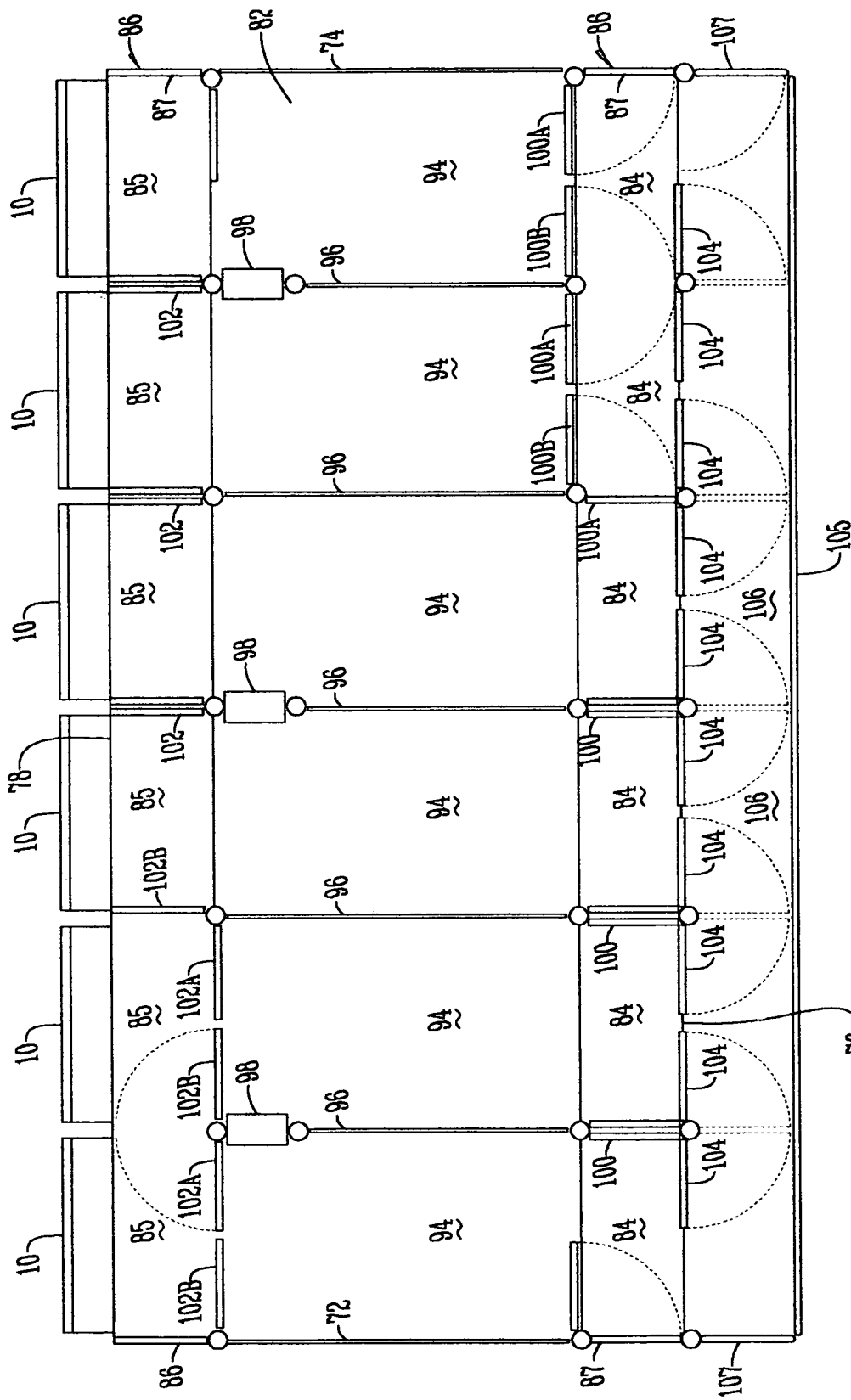
FIG. 5 is a plan view of the animal feeding facility of the present invention.

One application for the animal feeding device 10 is within an animal feeding facility 70, as shown in FIGS. 4 and 5. The animal feeding facility 70 includes opposite side walls 72 and 74, opposite open ends 76 and 78, and a slanted roof 80. Preferably, the animal feeding facility 70 is one-hundred eighty-three feet long and seventy-five feet wide. Additionally, it is preferred that end 76 face south.

The animal feeding facility further includes a sloped floor section 82, which is comprised of gravel covered with a layer of limestone chips. Preferably, the layer of limestone chips and gravel is approximately 9" in depth. The gravel and limestone facilitates the drying of the floor 82 and manure, which is better on the hooves and feet of livestock. Additionally, the slope of the floor section 82 allows the movement of the livestock to work the manure downwards, thereby facilitating easier cleanup. Floor section 82 is disposed between alleys 84 and 85, which are paved with concrete and can support the weight of tractors, trucks, and other farm implements.

Side walls 72 and 74 of the feeding facility 70 have openings 86 to allow tractors, trucks, and other farm implements to enter the feeding facility 70 and travel within the alleys 84 and 85. Preferably, the openings are approximately fourteen feet in height and sixteen feet in width. The openings 86 have half doors 87 with a gate 88 that prevents livestock from exiting the feeding facility 70 and swings outward to allow vehicles to enter. Preferably, gates 88 are six feet in height. Additionally, the half doors 87 have an overhead slide portion 90 that moves vertically along and in the same plane as the side walls 72 and 74 of the building 70 to allow access to opening 86. Thus, overhead slide portion 90 can be raised to an open position while half gate 88 remains closed to allow air flow into the building or lowered to a closed position to protect against weather elements. Also, both the half gate 88 and the overhead slide portion 90 of the half door 87, when open, provide access to opening 86 that allows an operator to move equipment into alleyways 84 and 85.

Side walls 72 and 74 further include butterfly doors 92, which pivot to open. An operator may position the doors 92 as desired to vary the air flow through the feeding facility 70.

The animal feeding facility 70 is comprised of a plurality of pens 94, with a wall or partition 96 that separates each pen from one side 72 to the opposite side 74 of the building 70. Each partition 96 extends along the length of building 70 between ends 76 and 78 and some of the partitions 96 include a waterer 98 so that access to water is provided to each pen 94. Positioned at one end of each pen 94 and forming an end wall for each pen is a feeder 10. Preferably, each pen 94 is approximately seventy-five feet long and thirty feet wide. As such, each pen 94 holds as many as fifty-six head of cattle.

Positioned at each end and in alignment with the partitions 96 are double gates 100 and 102 that extend across the alleyways 84 and 85 respectively. The gates 100 and 102 have separate portions rotatably mounted to a post or similar structure such that first portions 100A and 102A are independently movable from second portions 100B and 102B. The independent movement of the portions of gates 100 and 102 provide selective access to various pens 94 and portions of alleyways 84 and 85.

For instance, when the gates 100 and 102 are in alignment with partitions 96 and extend across alleyways 84 and 85 to ends 76 and 78, the pens 94 are completely separated from one another. Alternatively, the gate halves 100A, 100B and 102A, 102B are moved perpendicular to partitions 96, as shown in FIG. 5, to selectively shorten pens 94 and form alleys 84 and 85. As such, a farmer may drive a skid loader through opening 86 and into alleys 84 and 85 without interfering with the livestock, which are kept in the selected portion of the pens 94 between the alleys 84 and 85. The gate halves 100A, 100B and 102A, 102B may be positioned in any desired manner to create compartments within the pens 94 to sort or retain the livestock or provide access to alleyways 84 and 85.

Gates 100 and 102 are particularly useful when cleaning the pens 94. By positioning the gates 100 and 102, a farmer may retain livestock in one portion of the pen 94 while having access to the remainder of the pen 94 for cleaning. Additionally, the farmer may position the gates 100 and 102 in such a manner as to move livestock from one pen 94 to an adjacent pen 94.

Extending across open end 76 are gates 104 that open out into an open lot area 106. The open lot area is defined by the area between the exterior end partition 105, the end gates 107, and end 76. Gates 104 are approximately fifteen feet in length and are positioned as desired to create various compartments to retain livestock within the feeding facility 70 or allow the livestock to move out into the open lot area 106 depending upon weather conditions. End gates 107 are rotatably mounted on posts or similar structure along exterior end partition 105 and allow access into the lot area 106 at the sides. The positioning of the end gates 107 and gates 104 allow access to the open lot area 106 when weather conditions permit. For example, in the spring, when the sun shines approximately halfway into pen 94, the gates 104 are opened to extend into the lot area 106 so that there is more room for the livestock in the sun and crowding is avoided. In winter months, because the sun is low in the sky, there is sufficient sun, and gates 104 are positioned to close off end 76.

To further protect livestock from weather conditions, a curtain 108 is moveably secured to the roof 80 and is suspended above the top of the feeders 10. As end 76 preferably faces south, end 78 is protected from direct sunlight. The curtain 108 is positioned vertically as desired to protect the livestock against winds and inclement weather. Preferably, the curtain 108 is comprised of an upper piece and a lower piece. During the winter months, the upper piece of curtain 108 may be lowered as much as two feet to provide ventilation between the top of curtain 108 and the roof 80. Because the roof 80 has an overhang approximately three feet along end 78, inclement weather such as snow or rain are prevented from entering the building 70 when the upper portion of curtain 108 is lowered. During the warmer seasons, the lower portion of curtain 108 may be raised by as much as eight feet to provide ventilation between the bottom of curtain 108 and the top of feeders 10. In this arrangement, an operator can position the upper and lower portions of curtain 108 year-round to create a desired opening for ventilation while protecting the livestock against winds, precipitation, and other inclement weather.

In operation, the feeding facility 70 can house more than three-hundred head of cattle. Cattle and other livestock within the pens 94 have access to the feeder 10 and the waterer 98, and can be protected from the elements by side walls 72 and 74 and by the curtain 108. The gates 100 and 102 may be positioned such that livestock may move from one pen to another via alleys 84 or 85. Additionally, the gates 104 may be positioned such that livestock may move out into the open lot area 106. As such, individual pens 94 may be quickly and easily cleaned without significantly affecting the livestock. In this arrangement, the feeding facility creates a calming environment, which encourages the livestock to eat regularly and remain healthy.

It is therefore seen that by the use of a first slide adjacent the baffle and a second slide in spaced alignment to the first slide, the present invention permits the efficient and controlled dispensing of feed while preventing rain and other moisture from entering the hopper and saturating the feed.

What is claimed is:

1. An animal feeding device for storing and dispensing feed comprising:
    a trough;
    a hopper located above the trough and having opposite sides, opposite ends, an open bottom, and an open top;
    a downwardly sloping baffle disposed within the hopper and having a base secured to the trough;
    a first slide moveably connected to a side of the hopper and positioned adjacent the base of the baffle;
    a guide attached to the same side of the hopper as the first slide;
    a second slide moveably connected to the guide of the hopper and positioned in spaced alignment to the first slide;
    wherein the first slide is positioned between the hopper and the second slide; and
    wherein a turn buckle is secured to the same side of the hopper as the guide and the first slide and secured to the second slide such that when the turn buckle is rotated, the second slide slides vertically in relation to.

2. The device of claim 1 further comprising a lid extending across the top of the hopper.

3. The device of claim 2 further comprising a winch assembly mounted to the hopper and operatively connected to the lid for opening and closing the lid.

4. The device of claim 1 further comprising a window positioned on the hopper for determining the amount of feed in the hopper.

* * * * *